United States Patent [19]

Juy

[11] 4,392,841
[45] Jul. 12, 1983

[54] GUIDE SPROCKET WHEEL, MORE PARTICULARLY FOR THE GEAR SHIFT DEVICES OF BICYCLES AND THE LIKE

[75] Inventor: Henri Juy, Dijon, France

[73] Assignee: Le Simplex, France

[21] Appl. No.: 161,399

[22] Filed: Jun. 20, 1980

[30] Foreign Application Priority Data

Jun. 26, 1979 [FR] France ................... 79 17272

[51] Int. Cl.³ ................. F16H 55/30; F16H 11/08; B62M 9/12
[52] U.S. Cl. ................................ 474/156; 474/82
[58] Field of Search ............... 474/152, 156, 164, 82, 474/133, 134

[56] References Cited

U.S. PATENT DOCUMENTS

| 257,445 | 5/1882 | Lechner | 474/152 |
|---|---|---|---|
| 590,649 | 9/1897 | Ribyu, Jr. | 474/156 |
| 591,270 | 10/1897 | Gauthier | 474/156 |
| 2,602,343 | 7/1952 | Barrett et al. | 474/156 |
| 3,448,628 | 6/1969 | Shimano et al. | 474/82 |
| 3,969,947 | 7/1976 | Martin et al. | 474/156 |
| 4,174,642 | 11/1979 | Martin et al. | 474/156 |

FOREIGN PATENT DOCUMENTS

| 1063864 | 5/1956 | Fed. Rep. of Germany | 474/164 |
|---|---|---|---|
| 1262141 | 2/1968 | Fed. Rep. of Germany | 474/152 |

Primary Examiner—Allan D. Herrmann
Attorney, Agent, or Firm—Eric P. Schellin

[57] ABSTRACT

Guide sprocket wheel comprising a plurality of teeth corresponding to the pitch of the chain, the tops of the teeth being chamfered on bevelled on the periphery and on the lateral faces of the wheel. The angles of incidence of the teeth are cut off by further chamfers or bevels around the profile of the teeth, which gradually reduce the thickness of the teeth from the base to the tops thereof.

7 Claims, 11 Drawing Figures

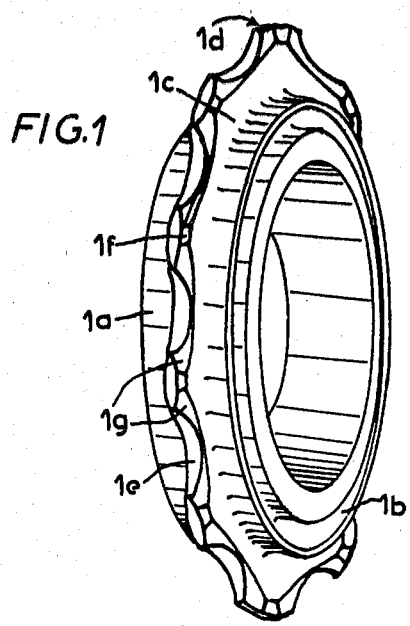
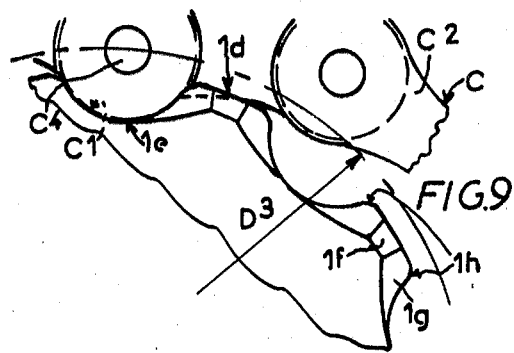
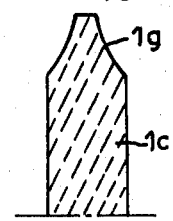
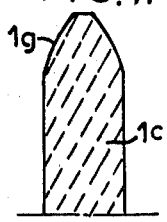
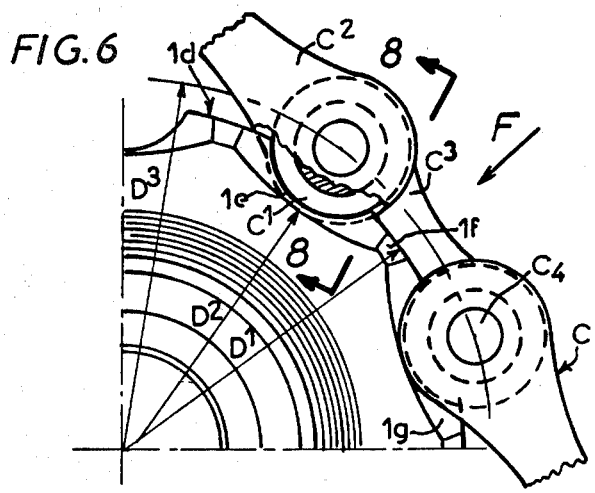
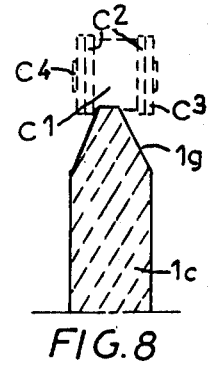
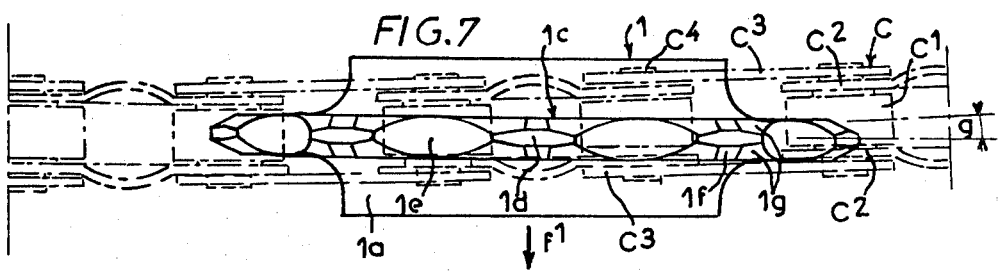

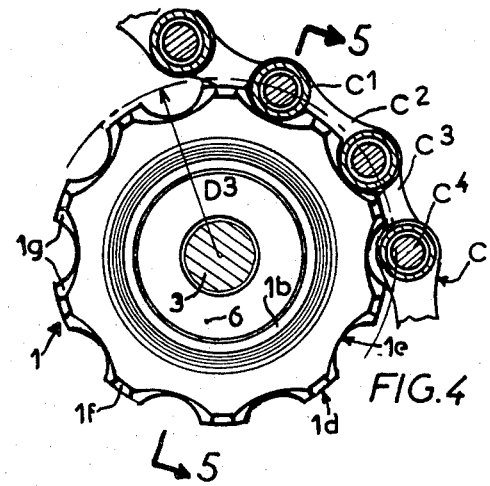
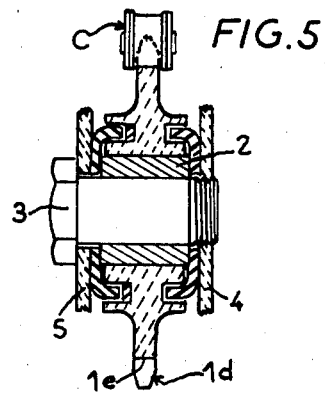
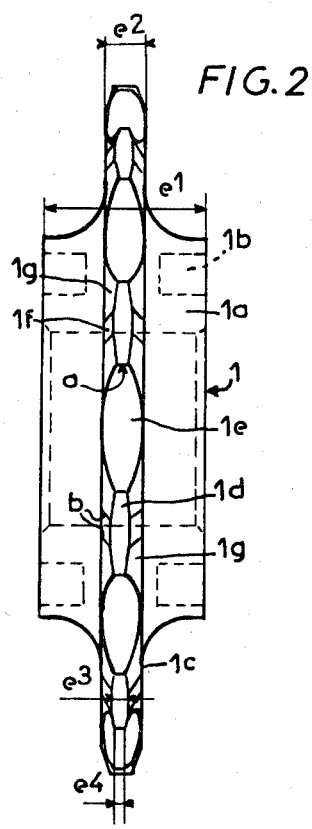
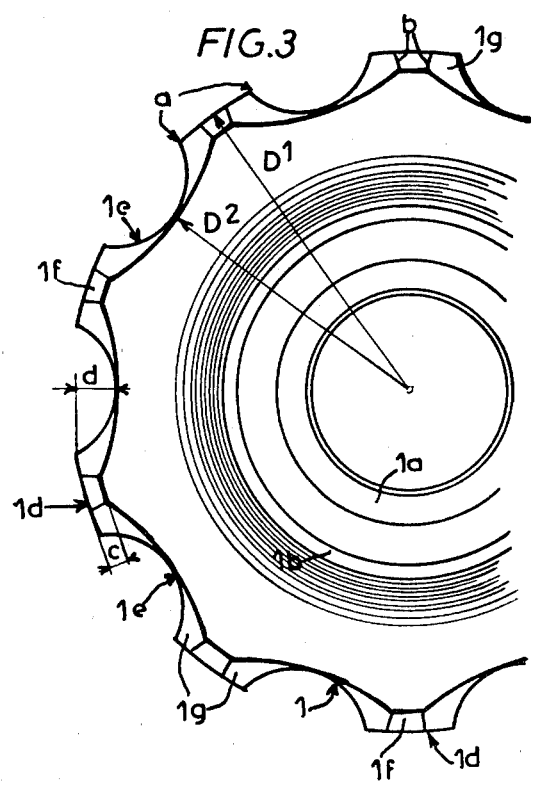

GUIDE SPROCKET WHEEL, MORE PARTICULARLY FOR THE GEAR SHIFT DEVICES OF BICYCLES AND THE LIKE

The present invention relates to a guide sprocket wheel, more particularly for the gear shift devices of bycycles and the like. Concurrently, the gear shift devices or other devices or apparatus equipped with one or more sprocket wheels or pinions in accordance with the invention are included within the scope of the invention.

The present invention belongs to the technical field of transmission organs for cycles, and more particularly, to the means for winding and shifting a chain transversely by the gear shift devices, and more particularly, the rear shift mechanisms.

In gear shift devices for bicycles and the like, which are of various designs and are generally with deformable parallelograms, it is well known to use one or more sprocket wheels which are shifted crosswise to drive a chain and cause it to pass over any one of the toothed gears of the freewheel of a cycle. The wheel has teeth which correspond to the pitch of the chain, the latter being generally of the type with rolls and flanges (Galle chain).

In these devices, the part of the wheel or wheels is particularly important, as these sprocket wheels are the means through which the gear shift mechanism (also called "derailleur") is permanently in contact with the transmission chain. The meshing of the links of the chain with the teeth of the gears is repeated ad infinitum, with a high frequency. The importance of the manner in which the contact of each link of the chain with each tooth of the wheel takes place will be readily understood. This importance is substantially increased upon consideration that, when it is desired to change the gear ratio, the wheels are shifted transversely and the chain is pulled up laterally with the reactions and effects resulting therefrom. In all the operational steps, and more particularly in the gear shifting step, the meshing and the contacts of the links with the teeth must necessarily take place under good conditions to provide for correct operation of the gear shift device and for the satisfaction of the user, for preventing the chain from falling off, for a smoother and more accurate control of the gear shift device, and for elimination as much as possible the shocks and vibrations which are unpleasant and become destructive in the long run.

With this aim in view, Applicant is presently working out French Pat. No. 1,168,825, which relates more particularly to a bilateral uniform bevelling on the entire periphery of the recess of the teeth. However, it is well known that, pursuant to the research work for lesser weight and bril decrease which is now prevalent in the cycle industry, novel chains, called "narrow" or "compact", have been launched on the market. Such chains make it possible to mount freewheels which have a greater number of pinions (seven, for instance). Because of the more pronounced disalignment, said chains are designed for a good transversal flexibility. The dimensions of their inner and outer flanges are reduced, and, therefore, these flanges are frequently about the same size as the rolls.

As the conditions of the contact of the links with the teeth of the rollers are thus modified, the wheel in accordance with the present invention has been developed, designed, and created to provide the best conditions of contact and operation, in an all purpose manner, for the narrow chains as well as previously used conventional chains.

The roller of the present invention includes a plurality of teeth corresponding to the pitch of the chain. The tops of the teeth are bevelled on the periphery and on the lateral faces of the wheel. On the lateral faces of the wheel, the angle formed at the tops of the teeth, on the side of the recesses between the teeth (the angle of incidence of the teeth), are cut off by further bevels around the profile of the teeth. The thickness of the teeth from the base up to the tops is gradually reduced thereby. The bevels are formed to have no value at the bottom or adjacent to the bottom of the recesses of the teeth, the thickness of the wheel at the bottom of the recesses of the teeth being thus not modified.

These and other characteristics will be apparent from the following description.

FIG. 1 is a perspective view illustrating a wheel in accordance with the invention.

FIG. 2 is a side view on a larger scale, of the wheel in accordance with the invention.

FIG. 3 is a front view of the wheel of FIG. 2.

FIG. 4 is a sectional view in part, considered along the line 4—4 of FIG. 5, showing a wheel in accordance with the invention which is meshed with a so-called "narrow" chain.

FIG. 5 is a sectional view considered along the line 5—5 of FIG. 4 illustrating the upper wheel mounted between the flanges of the chain guide of a gear shift device and the so-called "narrow" transmission chain.

FIG. 6 is a view in part on a larger scale, showing the points of contact of the chain with the tooth inlet bevel by the winding up in disalignment of the chain.

FIG. 7 is a plan-view according to the arrow F, corresponding to FIG. 6.

FIG. 8 is a sectional view in part considered along the line 8—8 of FIG. 6, showing the contact of the chain in disalignment with the tooth input bevel in accordance with the invention, at the beginning of the meshing step.

FIG. 9 is a view in part illustrating an alternative form of embodiment of the tops of the wheel teeth.

FIGS. 10 and 11 are sectional views in part, similar to FIG. 8, and illustrating alternative forms of embodiment in the section of the tooth input bevel.

In order to make the object of the invention more clearly understood, the invention will be described now under the forms of embodiment as illustrated in the Figures of the drawings, the invention not being restricted by such forms of embodiment.

The wheel in accordance with the invention will now be described, more particularly with reference to FIGS. 1, 2, 3, and 5.

The wheel is comprised of a hub $1a$ having a thickness $e1$, and bored for mounting onto, for example, a race bushing 2. The bushing in turn is mounted rotatably on a smooth spindle or the smooth portion of a screw 3 for mounting on the flanges 4 and 5 forming the chain guide of a gear shift device. Sealing cups 6 are received in a known manner within lateral flanges and the bushing 2 (FIG. 5).

A portion $1c$ of narrower thickness (thickness $i2$) extends peripherally around the hub $1a$ and includes a plurality of teeth $1d$ (10 in the example as illustrated). The teeth are regularly distributed and separated by the recesses $1e$ in the form of a sector of a circle, the rolls $C1$ of the chain C which is to be wound up on the wheel being housed within the recesses $1e$.

The teeth 1d are chamfered or bevelled at 1f in a known manner, on either side of the portion 1c, to provide a top area of the teeth which is thinner (thickness e3, FIG. 2), in order to make engagement of the teeth between the flanges of the chain easier.

According to the present invention, the angles a formed at the tops of the teeth and on the sides of the recesses between the teeth, which are called angles of incidence of the teeth, are cut off by gradual chamfers or bevels 1g which decrease gradually the thickness of the teeth in these areas (1f thicknesses e4 at angle a, FIG. 2).

The intersection of the chamfers or bevels 1g with the peripheral chamfer 1f are located adjacent to the medial portions of the teeth. These intersections can be omitted by using a connecting bend b (FIG. 3) to suppress or minimize any hindering contact with the flanges of the chain when meshing takes place, and to improve the meshing conditions by situating these intersections beyond the passage area of the rounded profiles of the flanges.

It is important that the chamfers of bevels 1g be formed to have no valve at the bottom of the recesses of the teeth, or adjacent thereto, so that these bottoms do not have the reduced thickness e2 of the portion 1c of the roller. Then this thickness is not reduced, it is possible to ensure a minimal lateral play of the chain link on the wheel for any difference of the rounded profiles of the flanges C2-C3 relative to the rolls e1 of the chain (1f FIG. 5).

In the example as illustrated the peripheral chamfer or bevel 1f existing between the chamfers or bevels 1g is established in a depth c which is less than the depth d of the recesses of the teeth in order to maintain the normal thickness e2 on the largest diameter possible for improved transverse guiding of the chain (FIG. 3).

As illustrated in FIG. 9, the angles of incidence a of the teeth are preferably cut off by a transversal chamfer or bevel 1h, an involute or other type of profile, for easy engagement within the recesses of the teeth, without beveling at the angles, of the rolls C1 of the chain winding up according to an involute.

It will be noted that the chamfers or bevels 1g have a straight profile in cross section (FIG. 8), but that they can have a different profile, such as a convex or ogive painted profile (FIG. 11), or a concave profile (FIG. 10).

As stated before, the narrow or compact chains have inside flanges C2 and outside flanges C3 which are smaller than conventional chains more particularly, the connecting portions with the spindles C4 have approximately the dimension of the diameter of the rolls C1.

With a conventional wheel, the teeth penetrate less deeply between the flanges during winding up, which is awkward for transverse guiding of the chain. To obviate this disadvantage, it has been contemplated to increase the height of the teeth, i.e., the external diameter D1 of the roller; the inside diameter D2 (FIG. 3) of the bottom of the teeth is not modified. The radius of the recesses of the teeth is equal to the radius of the rolls of the chain. In this embodiment, the wheel maintains its efficiency with normal chains.

The wheel of the present invention may be made of any convenient material, more particularly of plastics having good mechanical characteristics such as those sold under the trademarks DELRIN, RILSAN.

Concerning the wheel which has been thus described, we will point out now more particularly, with reference to FIGS. 4–8, the effects achieved with regard to the contacts of the links of the chain with the teeth of the wheel, in the various meshing and operational steps of the gear shift device.

In the example as illustrated, the roller of the chain guide a rear gear shift device is considered.

As seen in FIGS. 4 and 5, the rolls C1 of the chain rest in the recesses 1e of the teeth, while the teeth 1d penetrate between the inside flanges C2 or the outside flanges C3 up to the proximity of the premitive diameter D3 of winding up or meshing with a small transverse play of the inside flanges.

When the chain guide is moved transversely, for instance, in the direction of the arrow f1, FIG. 7, to cause the chain to pass over another pinion of the freewheel, a deformation and disalignment of the chain occur relative to the wheel (angle g). This disalignment is more marked when the chain is passed over the small pinion of the freewheel while being wound up over the smaller toothed wheel of the crank-gear. The disalignment is converse when the freewheel has 6 or 7 pinions and the crank-gear has 2 or 3 toothed wheels. In these extreme cases, the inside flanges C2 of the chain can be offset relative to the teeth of the wheel (FIG. 7). The chamfer or bevel of incidence of the teeth 1g makes it possible to ensure the sure and correct meshing of the chain on the wheel by the natural sliding of the inside flanges C2 (even when they are near the top of the teeth, FIG. 8) on the chamfers or bevels 1g, as illustrated in FIG. 6. In FIG. 6, the outside flange of the chain has been omitted in order to show more clearly the inside flange C2 resting against the chamfer or bevel 1g.

The embodiment of tooth input bevels in accordance with the present invention can be used in other applications. Other applications include the crown gears of a freewheel, of a crank-gear, or any other toothed gear cooperating with a chain of the Galle type.

The advantages of the invention are clearly apparent from the above description. The following advantages can be particularly pointed out:

Guiding a chain with a minimum transverse play by means of the chamfer or bevel of incidence together with the increased tooth height. This is particularly true for narrow or compact chains with smaller flanges. The control by means of the gear shift lever is more accurate. The accuracy and guidance from the gear shift lever are improved because of the correct and quick meshing provided by the chamfers or bevels. This meshing results from the form and thickness of the teeth at the tops, making control possible without trial and error.

Vibrations resulting from multiple and repeated contacts between the teeth and the rolls and flanges are substantially decreased and possibly suppressed because of the improved incidence of the teeth on the rolls of the chain by the chamfers or bevels in accordance with the invention. The angle of incidence is also reduced. Therefore, the operation is smoother and more efficient, even when the chain line is slanted relative to the general plane of the frame.

The present invention is in no way limited to the forms or use nor to the embodiments of its various parts which have been more particularly described. On the contrary, all the alternative forms of use and embodiments are included within the scope of the invention.

I claim:

1. A guide sprocket wheel adapted for engagement with the rolls of a chain, comprising a plurality of teeth corresponding to the pitch of the chain to be engaged, the tops of the teeth being chamfered or bevelled on the periphery and on the lateral faces of the wheel; wherein on the lateral faces of the wheel, the angles formed on the tops of the teeth and on the side of the recesses between the teeth are cut off by further bevels around the profile of the teeth, gradually reducing the thickness of the teeth from the base to the tops thereof; the bevels extending between a central peripheral bevel to the bottom of the recesses between two successive teeth such that the thickness of the wheel is not modified at the bottom of the recesses of the teeth.

2. A wheel according to claim 1 wherein the bevels between the teeth have a straight profile in transverse cross section and a concave profile between the peripheral bevel and the bottom of the recess between the teeth.

3. A wheel according to claim 1 wherein the bevels between the teeth have a straight profile in transverse cross section and a convex profile between the peripheral bevel and the bottom of the recess between the teeth.

4. A wheel according to claim 1 wherein the top bevels of the teeth have a convex profile in cross section.

5. A wheel according to claim 1 wherein the top bevels of the teeth have a concave profile in cross section.

6. A wheel according to claim 1 wherein the edges at the intersection of the bevels at the top of the teeth and of the peripheral bevel are reduced by connecting curves or rounded forms.

7. A wheel according to claim 1 wherein the angles formed at the tops of the teeth, on the side of the recesses of the teeth, are cut down to facilitate engagement of the rolls without friction or abnormal contact when the chain is wound up on the roller because of the recesses of the teeth relative to the primary winding diameter.

* * * * *